Patented Mar. 5, 1929.

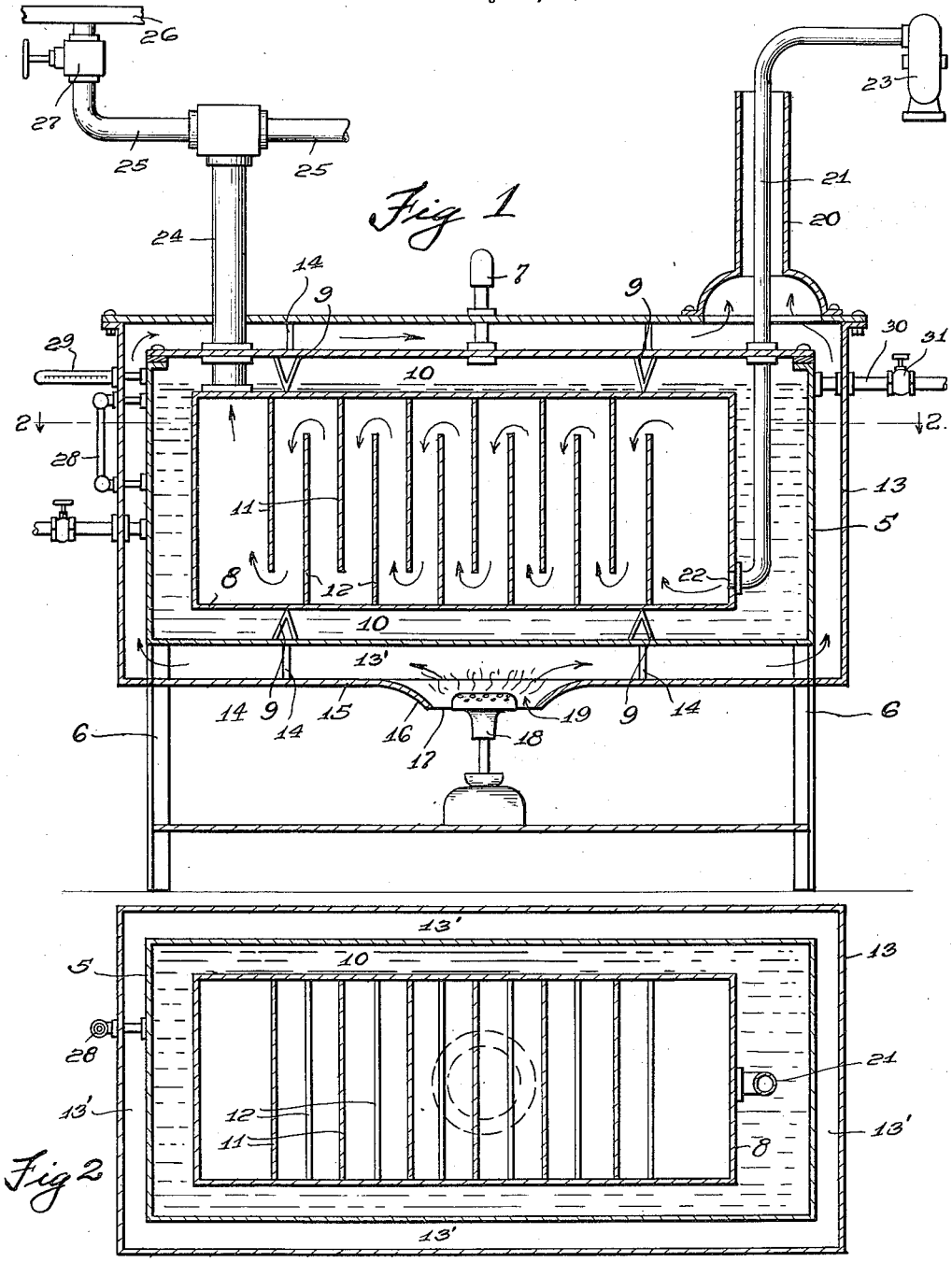

1,704,535

UNITED STATES PATENT OFFICE.

LEWIS GRAFFLIN, OF NORFOLK, VIRGINIA, ASSIGNOR TO THE TWO SEASON PROCESS, INC., OF NORFOLK, VIRGINIA, A CORPORATION OF VIRGINIA.

HEATING AND COOLING APPARATUS.

Application filed May 17, 1927. Serial No. 192,100.

My invention relates to apparatus for regulating the temperature within a room or the like, either raising or lowering the temperature, by means of introducing air, at a selected temperature into the room.

An important object of the invention is to provide a unit which may be readily converted into either a heating or cooling apparatus.

A further object of the invention is to provide means for effecting the maximum heat exchange between the heating medium, and the air, to be heated and supplied to the room.

A further object of the invention is to provide means for utilizing the heat from the products of combustion, which is ordinarily dissipated, for preheating the air before passing into the heating unit.

A further object of the invention is to provide apparatus of the above mentioned character which is extremely simple in construction, cheap to manufacture and may be operated at the minimum cost.

Other objects and advantages of the invention will be apparent during the course of the following description.

In the accompanying drawings, forming a part of this specification, and in which like numerals are employed to designate like parts throughout the same, Figure 1 is a central vertical longitudinal section through apparatus embodying my invention, and, Figure 2 is a horizontal section taken on line 2—2 of Figure 1.

In the drawings, wherein for the purpose of illustration, is shown a preferred embodiment of my invention, the numeral 5 designates a preferably horizontally arranged jacket or tank, which is preferably square in cross section. This tank may be supported by legs 6, as shown. The tank 5 is closed to the atmosphere, and is preferably provided with an automatic pressure relief valve 7, at its top, adjusted to permit of the escape of steam pressure, when the apparatus is used as a heating unit. The valve 7 ordinarily opens to a pressure from about one and one-half to three pounds above atmospheric pressure, while the invention is in no sense restricted to this range.

Disposed within the other tank or jacket 5 is an air receiving shell or tank 8, which is spaced from all walls of the tank 5, both vertically and horizontally, by means of spacing elements 9, of any well known or preferred type. The tank 8 forms with the tank 5 a surrounding passage 10, for the reception of a heat transfer medium, preferably in the form of a fluid, such as water.

Arranged within the air receiving tank 8 are sets of vertical transverse baffles 11 and 12, carried respectively by the top and bottom and sides of the tank 8, causing the air to pursue tortuous passage through the tank 8. This aids in effecting a proper heat exchange between the fluid medium within the passage or space 10 and the air within the tank 8.

Surrounding the water jacket or tank 5 is an outer jacket 13, spaced from the top, sides and ends of the tank 5. Spacing elements 14 are preferably arranged between these parts. At its bottom, the jacket 13 projects downwardly below the tank 5 for a considerable distance and is equipped with a bottom 15, also spaced from the bottom of the tank 5. The bottom 15 is provided with an upwardly flaring or funnel shaped portion 16, equipped with an opening 17. The upwardly flaring portion 16 is preferably arranged centrally of the bottom 15 and tank 5.

The numeral 18 designates a source of heat, preferably an oil burner of the Bunsen type. This burner 18 is preferably arranged within alinement of the opening 19, whereby heated gases and products of combustion generated thereby all pass into the lower portion of the outer jacket 13, in contact with the bottom of the tank 5. The opening 17 permits of the free entrance of air to the burner 18 to support the combustion. The products of combustion pass through the space 13', surrounding the tank 5 and thus completely envelop such tank effecting the maximum heat exchange with the water within the tank 5. The products of combustion, deprived of the major portion of their heat, then discharge through a pipe or stack 20, discharging to any suitable point.

Air, under suitable pressure, is supplied to the bottom of the air receiving tank 8, at one end thereof, through a pipe 21. This pipe passes centrally through the stack or pipe 20, and is of smaller diameter whereby it does not improperly interfere with the escape of the products of combustion. However, by passing the pipe 21 through the stack or pipe 20, the air is preheated before entering the tank 8. The pipe 21 passes through the top of the water tank or jacket 5, and then passes through the water in this tank and leads to the bottom of the air receiving tank 8, at the intake end thereof, as shown at 22. The air traveling through that portion of the pipe 21 submerged in the water within the tank is preheated before entering the tank 8.

The pipe 21 has connection with an air pump, preferably a rotary fan 23, which is adapted to force the air through the unit, at a suitable pressure above atmospheric pressure, such as about one-half of a pound above atmospheric pressure.

Leading into the top of the air receiving tank 8, adjacent to its outlet end, is a pipe or header 24, to which are connected any suitable number of pipes 25, preferably of smaller diameters, which may lead to radiators 26, preferably located in the room to be heated, adjacent to the floor. Each pipe 25 is preferably provided with a cut-off valve 27.

The tank 5 is preferably provided with a water tube gage 28, indicating the level of the water within the same. The water should be maintained within the tank 5 at a level to cover the top of the tank 8, for about an inch. A water thermometer 29 is also preferably provided leading to the interior of the tank 5, to indicate the temperature of the water therein.

Water is supplied to the tank 5 at one end thereof, through a pipe 30, equipped with a valve 31. This pipe 30 may have connection with the usual city main or any other suitable source of water.

In the operation of the apparatus as a heating unit, the desired level of water is maintained within the tank 5 and completely envelops the air receiving tank 8. The burner 18 is set into action and the heated gases and products of combustion pass through the outer jacket 13 and completely envelop the water tank 5 thereby heating the water therein. The motor 22 is set into action and air is forced through the pipe 21 and passes between the baffles 11 and 12, within the tank 8. This air is preheated before entering the tank 8, as explained, and when passing through the tank 8 it absorbs heat from the water within the tank 5 and then passes to the header 24 and through the pipes 25 to the register 26. The motor 22 is preferably driven at a constant speed and the volume of heated air supplied to the room through the register 26 is regulated by adjusting the valve 27. As soon as the water tank 5 is sealed to the atmosphere, a pressure may be built up therein, above atmospheric pressure, as explained, and this permits of the temperature of the water within the tank 5 being raised above the boiling point.

When it is desired to use the apparatus as a cooling unit, the thermometer 29 may be removed from the opening within the outlet end of the tank 5, and a pipe screwed into this opening, constituting an outlet for the water. The valve 31 is then opened, and water from the city main, at a temperature of about 60° F. to 65° F. is thus circulated through the tank 5. The burner 18 is, of course, inactive, while the fan is set into operation and the air is forced through the tank 8, and effects a heat exchange with the water within the tank 5, with the result that the temperature of the air is lowered. This cooled air is now fed to a register 26, as explained.

It is to be understood that the form of my invention, herewith shown and described, is to be taken as a preferred example of the same, and that various changes in the shape, size and arrangement of parts may be resorted to without departing from the spirit of my invention or the scope of the subjoined claims.

Having thus described my invention, I claim:

1. In a heat exchange apparatus, an air pressure storage tank, spaced baffles within the tank, an air inlet pipe leading into the tank near one end thereof, an air pump connected with the air inlet pipe and adapted to force air into the same under suitable pressure, an air outlet pipe leading from the tank near its opposite end for conducting the heated air to a desired point or points, a water jacket surrounding the air pressure storage tank and being closed to the atmosphere whereby a pressure may be built up therein above atmospheric pressure, and means for applying heat to the exterior of the water jacket.

2. In a heat exchange apparatus, an air pressure storage tank, spaced baffles within the tank, an air inlet pipe leading into the tank near one end thereof, an air pump connected with the air inlet pipe and adapted to force air through the same under suitable pressure, an air outlet pipe connected with the tank near its opposite end and having air forced therethrough by the pressure within the tank without undue agitation of the air, the outlet pipe leading to a desired point or points, a water jacket surrounding the air pressure storage tank and being closed to the atmosphere whereby a pressure may be built up therein above atmospheric pressure, an outer jacket surrounding the water jacket and spaced therefrom for providing a passage for a heating fluid.

3. In a heat exchange apparatus, a relatively large air pressure storage tank, spaced baffles within the tank, a water jacket surrounding the tank and being closed to the atmosphere whereby pressure may be built up therein above atmospheric pressure, an air inlet pipe leading into the tank near one end thereof, an air pump connected with the air inlet pipe and adapted to force air through the same under suitable pressure, an air outlet pipe connected with the tank near its opposite end and adapted to have air forced therethrough by the pressure within the tank without undue agitation of the air, the outlet pipe leading to a desired point or points, an outer jacket surrounding the water jacket in spaced relation and provided in its bottom with a relatively small inlet opening and in its top with an outlet opening, and means for discharging a heating fluid through the inlet opening.

4. In a heat exchange apparatus, an air pressure storage tank, spaced baffles within the tank, an air inlet pipe leading into the tank near one end thereof, an air pump connected with the air inlet pipe and adapted to force air through the same under suitable pressure, an air outlet pipe connected with the tank near its opposite end and having air forced therethrough by pressure within the tank, the outlet pipe leading to a desired point or points, a water jacket surrounding the tank and being closed to the atmosphere whereby pressure may be built up therein above atmospheric pressure, an outer jacket surrounding the water jacket and provided in its lower portion with an inlet opening, means discharging a heating fluid through the inlet opening, and an outlet pipe connected with the outer jacket for the discharge of the heating fluid and also surrounding a portion of the air inlet pipe to preheat the air.

5. In a heat exchange apparatus, an air pressure storage tank, spaced baffles within the tank, an air inlet pipe connected with the tank, an air outlet pipe connected with the tank, a water jacket surrounding the tank and closed to the atmosphere whereby a pressure may be built up therein in excess of atmospheric pressure, an outer jacket surrounding the water jacket in spaced relation and adapted to receive a heating fluid, the interior of the water jacket being permanently free from communication with the interior of the outer jacket whereby the heating fluid can not pass to the interior of the water jacket during the heating operation, means to discharge a heating fluid into the outer jacket, and inlet and outlet pipes connected with the water jacket and free from communication with the interior of the outer jacket whereby a cooling fluid may be circulated through the water jacket.

6. In a heat exchange apparatus, an air receiving and holding means provided with a plurality of passages through which the air travels, an air inlet pipe leading into the air receiving and holding means, an air pump connected with the air inlet pipe and adapted to force air through the same under suitable pressure, air outlet means connected with the air receiving and holding means and adapted to conduct the heated air to a desired point or points, a water jacket surrounding the air receiving and holding means and closed to the atmosphere, whereby a pressure may be built up therein above atmospheric pressure, and means for applying heat to the water within the water jacket.

In testimony whereof I affix my signature.

LEWIS GRAFFLIN.